J. THOMAS.

MACHINE FOR MAKING CEMENT PIPES.

APPLICATION FILED SEPT. 11, 1919.

Reissued Nov. 7, 1922.

15,487.

3 SHEETS—SHEET 1.

Inventor:

James Thomas,

By Hood & Ashley.

Attorneys,

J. THOMAS.
MACHINE FOR MAKING CEMENT PIPES.
APPLICATION FILED SEPT. 11, 1919.
Reissued Nov. 7, 1922.
15,487.
3 SHEETS—SHEET 2.
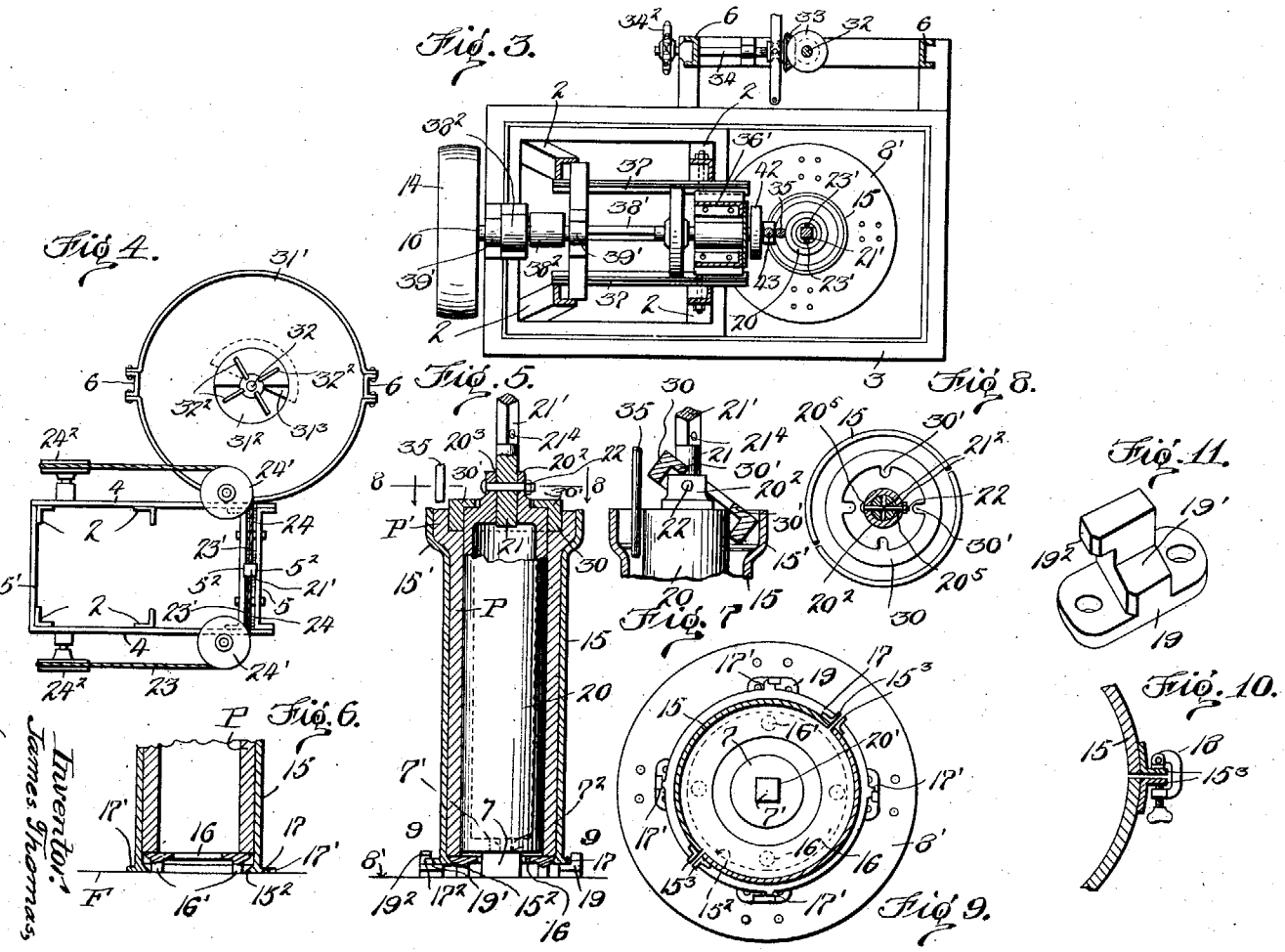
Inventor:
James Thomas,
By Hood & Fehley
Attorneys.

J. THOMAS.
MACHINE FOR MAKING CEMENT PIPES.
APPLICATION FILED SEPT. 11, 1919.
Reissued Nov. 7, 1922.
15,487.
3 SHEETS—SHEET 3.
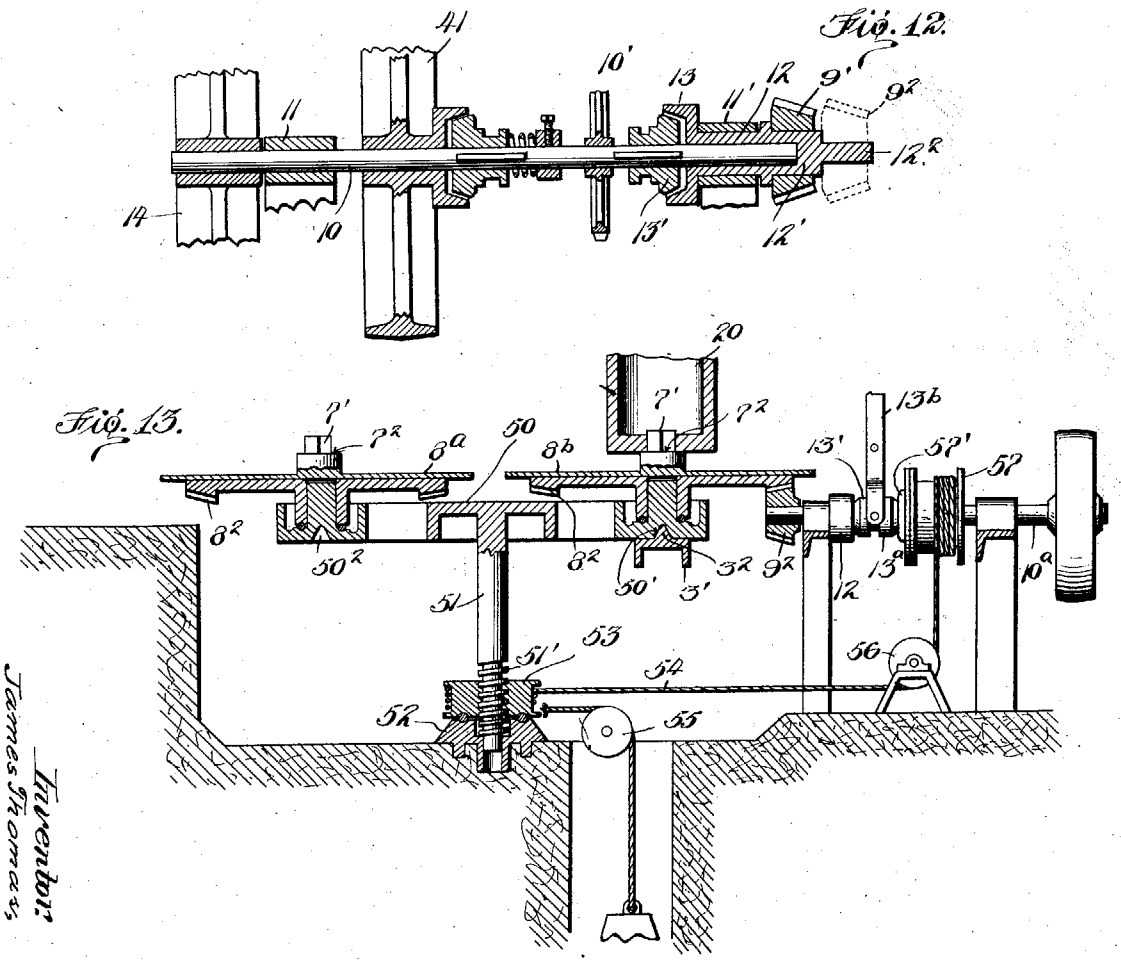
Inventor:
James Thomas,
By Hood & Ashley.
Attorneys.

Reissued Nov. 7, 1922. Re. 15,487

UNITED STATES PATENT OFFICE.

JAMES THOMAS, OF TACOMA, WASHINGTON.

MACHINE FOR MAKING CEMENT PIPES.

Original No. 1,211,787, dated January 9, 1917, Serial No. 59,906, filed November 6, 1915. Application for reissue filed September 11, 1919. Serial No. 323,180.

*To all whom it may concern:*

Be it known that I, JAMES THOMAS, a citizen of the United States, residing at Tacoma, in the county of Pierce and State of Washington, have invented certain new and useful Improvements in Machines for Making Cement Pipes, of which the following is a specification.

This invention relates to cement pipe making machines of the class illustrated and described in my U. S. Patents, No. 929,898 of August 3, 1909, and No. 931,972, of August 24, 1909.

The object of the present invention is the perfecting of machines of this type to render them more durable and efficient in operation and whereby pipes may be more rapidly and economically produced.

The invention consists in the novel construction, arrangement and combination of parts, as will be hereinafter described and claimed.

Figure 2:
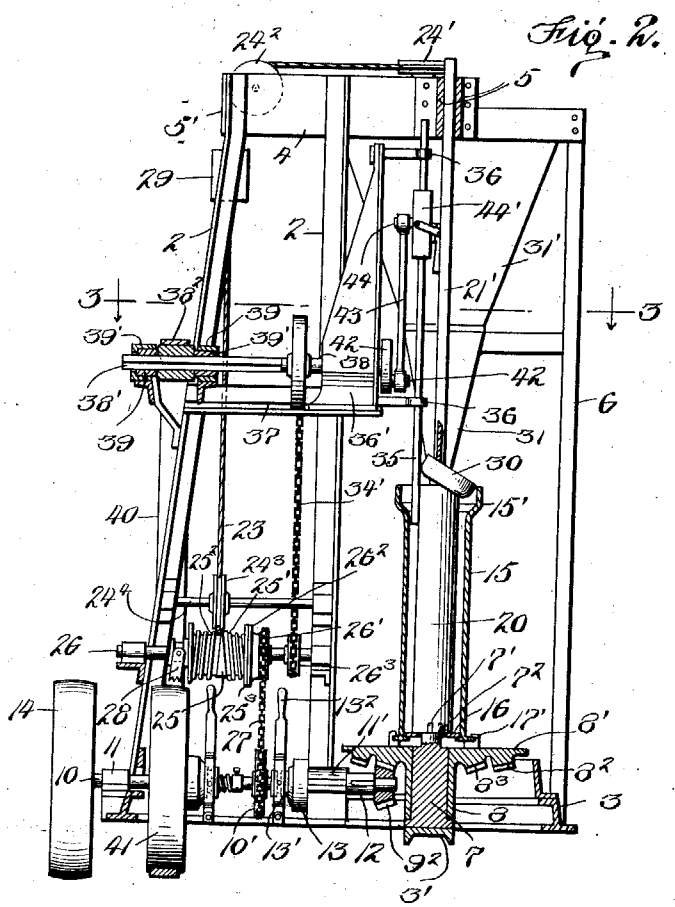
Figure 1:
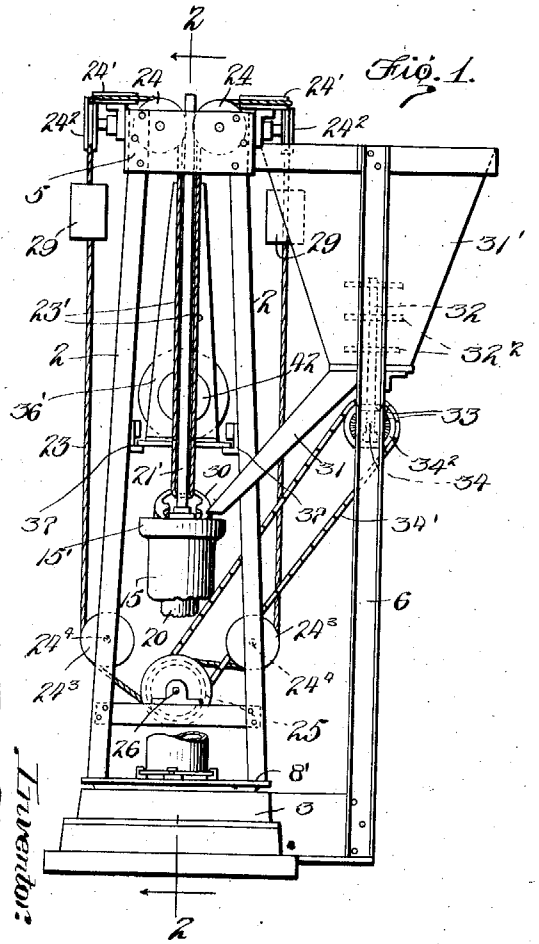

In the accompanying drawings, Figure 1 is a front elevation of a cement pipe machine embodying my invention. Fig. 2 is a transverse vertical section taken substantially through 2—2 of Fig. 1. Fig. 3 is a horizontal section through 3—3 of Fig. 2 with parts omitted. Fig. 4 is a top plan view of the machine frame. Fig. 5 is a transverse vertical sectional view of the mold and parts associated therewith in the forming of a pipe. Fig. 6 is a fragmentary sectional view of the lower ends of a pipe and the mold in the positions occupied after the latter has been released. Fig. 7 is a view similar to Fig. 5 illustrating the positions of certain parts in one stage of operation. Fig. 8 is a sectional view through 8—8 of Fig. 5. Fig. 9 is a sectional view through 9—9 of Fig. 5 with the pipe and core omitted. Fig. 10 is a detail horizontal sectional view of a portion of the mold. Fig. 11 is a perspective view of one of the mold stands shown detached. Fig. 12 is a longitudinal sectional view to illustrate the driving shaft of the machine and the various devices for transmitting power therefrom. Fig. 13 is a view partly in side elevation and partly in vertical section of a modified construction to illustrate the manner of employing two tables alternately and the controlling mechanism therefor.

The improved machine is provided with a main frame comprising post members 2 extending upwardly from a base 3 and rigidly connected at their upper ends to longitudinal tie-plates 4 and transverse tie-plates 5 and $5^1$. To one side of such main frame and rigidly connected therewith are upright posts 6 which serve to support the hereinafter explained concrete agitating and feeding appliances.

As shown in Fig. 2, I provide upon a bridge element $3^1$ of the frame base 3 a fixed standard 7 having a central portion which serves as the journal bearing for the hub 8 of a rotary table $8^1$ and extends above the latter to terminate in a polygonal upper end $7^1$ above a shoulder $7^2$ of the standard.

The table $8^1$ is provided on its under side with concentrically arranged circular racks $8^2$ and $8^3$ which are adapted to be selectively used with toothed pinions $9^1$ or $9^2$ to effect the rotation of the table at different speeds from a shaft 10. This shaft is journaled near one of its ends in a box 11 on the frame base and in a socket (Fig. 12) provided in a shaft extension 12 at its other end, said extension being in turn journaled in a box $11^1$. Said extension is formed at its outer end with portions $12^1$ and $12^2$ which are respectively adapted to fit into the bores of the above-mentioned pinions $9^1$ and $9^2$. Said extension is also formed with or has rigidly secured thereto a member 13 of a friction clutch whose other member $13^1$ is splined to the shaft and may be shifted into and out of engagement by a controlling lever $13^2$ according to whether the table is to be rotated or otherwise.

The shaft 10 is driven in any suitable manner, as by means of a power belt, not shown, passing about a pulley 14 of the shaft.

15 represents a mold with a cylindrical central portion and an enlarged upper portion $15^1$ which conforms to the outer surface of the hub end $P^1$, Fig. 5, of a pipe P which is molded therein. At its lower end the mold is provided with an internal flange $15^2$ to sustain the pipe support or palette 16, and at the outer side is a peripheral flange 17 from which protrude a number of spaced lugs $17^1$. $16^1$ represents legs provided for said palette, and are utilized for holding the latter when the mold is being disconnected from a pipe. Said mold is constructed of two or more laterally separable parts which are secured together by clamps, such as 18, Fig. 10, engaging upright flange elements $15^3$ provided adjacent to the joints between the mold parts. Chairs 19 are secured in adjusted positions upon the table and are each formed with a seating surface $19^1$ for the lower edge of the mold and are also formed with a laterally extending branch $19^2$ to afford a hook to engage over a lug $17^1$ of the mold to lock the latter in place upon the table.

20 represents a cylindrical core which in use is supported upon the standard shoulder $7^2$ and having at its bottom a polygonal socket $20^1$ to fit the standard end $7^1$ in various rotary positions, and when thus engaged the core is prevented from turning. At its upper end the core 20 is provided with a hub $20^2$ in which is the cylindrical socket $20^3$ to accommodate a correspondingly shaped lower end 21 of an upright bar $21^1$ which is thereabove rectangular in horizontal section.

The core is secured in various rotary positions to the bar $21^1$ by a pin 22 inserted in selected holes $21^2$ (Fig. 8) of the bar and holes $20^5$ provided in the diametrically opposite sides of the core hub $20^2$. Bar $21^1$ serves to retain the upper end of the core against turning and in axial alinement with the table, and is itself held against turning and in such axial alinement by extending through suitable guideways $5^2$ of the frame elements 5, in which guideways it is vertically slidable. Thus the core when in use is held from turning both at the top and bottom, by being fastened to the vertically slidable non-turnable bar 21 at the top and by fitting on the polygonal standard end $7^1$ at the bottom, so that the core is free from twisting and in consequence both it and its two rotation-preventing attachments may be made lighter than would be possible if either of such attachments were omitted.

The core is elevated or lowered by means of a cable 23 having a bight thereof engage the bar by extending through a hole $21^4$ provided in the latter adjacent to its connection with the core. From such bight the cable extends in two leads $23^1$ vertically upward and over guide sheaves 24 mounted in the opening between the frame elements 5 and thence about sheaves $24^1$, $24^2$, and $24^3$ to a drum 25 to which the extremities of the cable leads are secured.

To insure an equal winding or unwinding of both of the cable leads on or from the drum, the drum is provided with helical grooves $25^1$ and $25^2$ which extend from near its midlength to the drum ends. The guide sheaves $24^3$ which are disposed in proximity to said drum are mounted on shafts $24^4$ so as to be movable axially of the respective shafts when the cable is influenced by the drum grooves.

The drum is loosely mounted upon a jack shaft 26 which is driven from the main shaft 10 preferably by a chain 27 passing about sprocket wheels $26^1$ and $10^1$ provided on the respective shafts. To couple the drum to the shaft 26, a clutch element $26^2$ rigidly secured to the shaft, is frictionally engaged by a clutch element $25^3$ provided on the drum when the latter is suitably shifted as by a controlling lever 28. Counterweights 29 are desirably attached to said cable, as indicated in Figs. 1 and 2, to facilitate the raising of the core.

Supplemental to the core 20 is a collar 30 to provide an internal form for the mouth or bell-end $P^1$ of a pipe. Said collar during the making of the part of a pipe below such bell-end may be tilted out of the way, as indicated in Figs. 2 and 7 and when it is to be utilized, the collar is held in the position in which it is shown in Fig. 5 by means of lugs $30^1$ provided on the collar engaging the upper end of the core.

The concrete for making pipe is supplied to the space within the mold 15 through a chute 31 from a hopper $31^1$ which is supported by the frame posts 6.

The effective size of the outlet opening $31^2$ of the hopper may be regulated by a gate $31^3$. Extending into said hopper is an upright shaft 32 provided with fingers $32^2$ whereby the material adjacent to the hopper outlet is stirred or agitated to prevent the same from solidifying and to be in a homogeneous condition. The shaft 32 is rotated by means of bevel gear wheels 33 from a shaft 34 which, as illustrated, is driven from shaft 26 by a belt or chain $34^1$ through the medium of pulleys or wheels $34^2$ and $26^3$ on the respective shafts.

35 represents a tamping bar guided for vertical reciprocatory movements in bracket arms 36 of a carriage $36^1$ movable on horizontal track-rails 37 which are secured to the frame. This carriage is provided with a bearing box $36^2$ for a shaft 38 provided with a square portion $38^1$ which is slidable endwise in similar shaped apertures in a belt-pulley $38^2$ and bushings 39 which are journaled in boxes $39^1$ fixedly secured to the machine frame.

40 denotes the belt for transmitting rotary motion from a pulley 41 on the shaft 10 to the pulley $38^2$ to drive the shaft 38. The shaft 38 is arranged radially or nearly so to the axis of the bar $21^1$ and at its end adjacent thereto carries a disk 42 having a crank pin $42^1$ which is operatively connected by a rod 43 with a stud or pin 44 of a chambered block $44^1$ through which extends the tamping bar 35. Said block is provided interiorly with devices, not illustrated, which are adapted to frictionally engage the tamping bar to resistingly hold the latter against axial movement with respect to the block.

The tamping-bar in the early part of its operation is gripped in such position in the block $44^1$ so that it will almost reach the table when at the lower end of its stroke, as effected by the revolution of the crank-pin $42^1$. As the mold is fed with the concrete, the accumulation of the material will progressively cause the tamper to be shoved up through said block subject to the resistance due to the bar gripping devices of the block, and which may be adjusted so that the proper force will be applied to the work.

I show in Fig. 13 a manner of supporting two tables as $8^a$ and $8^b$ upon a platform 50 which is rotatable upon a post 51 journaled in a step-bearing 52 so that said tables may be alternately revolved into axial positions with the core for making a pipe.

Where two tables are thus used, the frame beam $3^1$ is provided with a protuberance $3^2$ to engage in recesses $50^1$ or $50^2$ as they are successively presented thereto. To cause such engagement of the platform with said protuberance, the platform is first elevated to raise the same from its engagement and after the platform has been manually or otherwise rotated, the platform is lowered to lock it in its adjusted position; to which ends the post 51 is provided with a screw-thread $51^2$ which is engaged with an internal screw-thread of a wheel 53 supported by the step-bearing 52.

54 is a cable having a weight $54^1$ at one end and after passing over a guide pulley 55 is wound in a number of turns about a wheel 53 and thence about a guide-pulley 56 to a drum 57 to which the other end of the cable 54 is secured. This drum is rotatably mounted on a power driven shaft $10^a$ and is coupled therewith when desired, by a clutch element $57^1$ of the drum being engaged by a clutch element $13^a$ which is engaged with the shaft $10^a$, as by a spline, not shown. The clutch element $13^a$ is shifted by a forked lever $13^b$ and may also be utilized to actuate the clutch element $13^1$ for the shaft extension 12 which, as shown in Fig. 14, is formed at one end of the element $13^a$.

To operate the above described platform, the drum 57 is coupled to the shaft $10^a$ resulting in the winding of the cable 54 about the drum and the rotation of the wheel 53 which serves as a nut upon post 51 to cause the platform to be raised from its engaged position with the frame protuberance $3^2$, whereupon the platform is rotated to transpose one end of the platform for the other. When this is accomplished, the drum 57 is released from its shaft and the power of the weight $54^1$ asserts itself to rotate the wheel 53 so as to lower the platform into locking position.

The operation of the invention may be explained as follows: With the table $8^1$ motionless, the mold 15 is secured centrally thereon by rotating the mold on the chair seats $19^1$ to engage the lugs $17^1$ under the chair branches $19^2$. The drum 25 is then uncoupled from the shaft 26 to lower the core 15 into engagement with the standard end $7^1$, whereby the core is secured at the bottom against turning, the non-turnable bar $21^1$ serving to secure it at the top against turning. Then the collar 30 is tilted to one side, as represented in Fig. 2, so as not to interfere with the operation of the tamping-bar 35. The shaft extension 12 upon which one of the bevel-gears $9^1$ or $9^2$ has been secured, is then operatively connected by clutch elements 13 and $13^1$ to the shaft 10 to effect the rotation of such gear to drive the table, through the agency of the rack $8^2$ or $8^3$. As the table is thus driven, concrete is supplied from the hopper $31^1$ through the chute 31 into the space surrounding the core in the mold and as such material is deposited in the mold, it is compacted through the office of the tamping-bar 35. This tamping-bar, as before explained, is yieldingly carried in a block $44^1$ so that as the material rises toward the top of the mold, the tamping-bar will correspondingly slide upwardly through the box subject to the resistance due to the frictional engagement of the referred to devices in such block. After the concrete has been supplied to about the bottom of the enlarged portion $15^1$ of the mold, the carriage $36^1$ is moved back to carry the tamping bar into proximity to the inner periphery of the mold part $15^1$. The collar 30 is then placed in its operative position, as represented in Fig. 5, and the filling in and tamping of the material is proceeded with until a pipe is completed.

In the above described operation, the core remains stationary while the mold and palette rotate with the table and by reason of the surfaces of the mold and palette which are in contact with the material being greater than the surface of the core which contacts with the material, the pipe in the process of making is rotated with the mold and the inner pipe surface is rubbed against the core to effect the glazing of such inner surface.

When a pipe has been formed in the mold the core is withdrawn, while the mold and pipe are still turning, by being hoisted through the instrumentality of the cable 23 which, by being arranged to suspend the core-supporting bar $21^1$ in a bight of the cable and between two leads which extend vertically, raises the bar and core axially of the pipe. As the core is so raised, it is prevented by the non-turnable bar $21^1$ from turning with the still rotating mold and pipe.

The mold with the contained pipe and palette 16 are removed from the table and placed on a floor F, Fig. 6, whereupon the clamps 18 are disengaged to release the pipe and the mold then drops to the floor while the pipe is maintained at a distance above the floor by being borne upon the palette which is itself held by the legs $16^1$. By thus allowing the mold to fall in a direction axially of the pipe, the mold is freed and enables it to be opened laterally and removed without any cement adhering thereto, as will occur when the mold is opened laterally without first dropping to strip it from the material.

When a pipe and its mold have been removed from the table, it is replaced by another mold and a pipe formed therein, as described.

By provision of a polygonal end $7^1$ to the core-supporting standard and with a similar shaped socket in the core, the core may be held in its various rotary positions so as to successively present new portions to where the tamping is being effected for, otherwise, a non-rotatable core would soon become worn at one side and become unfitted for use.

What I claim as my invention, is—

1. In a machine of the class described, the combination with a mold, a rotary table for supporting said mold, and means to rotate the table and said mold, a non-rotatable standard extending upwardly through the center of said table, a core provided with means engageable with said standard whereby the core is held centrally of the table and against rotary movements.

2. In a machine of the class described, the combination with a mold, a rotary table for supporting said mold, and means to rotate the table and said mold, a non-rotatable standard extending upwardly through the center of said table and terminating above the latter in a polygonal head, and a cylindrical core provided at its lower end with a socket, said socket being adapted to engage the standard at various rotary positions of the core, to secure the latter against rotary movements.

3. In a machine of the class described, the combination with a mold, a rotary table for supporting said mold, and means to rotate the table and said mold, a non-rotatable standard extending upwardly through the center of said table and terminating above the latter in a polygonal head, a cylindrical core provided with a socket in its lower end, said socket being adapted to engage the standard at various rotary positions of the core to secure the later against rotary movements, a hoisting rod for said core, and means to secure the core to said rod in selected rotary positions.

4. In a machine of the class described, a core, an upright rod having an opening adjacent its lower end, means to detachably connect said core to the lower end of the rod, a guide for said rod, a hoisting cable arranged with a bight engaging said rod in the opening thereof, a cable winding drum, and guide sheaves for directing said cable to extend upwardly at opposite sides of the rod from said opening and thence to said drum.

5. In a machine of the class described, the combination with the rotary table, a mold provided with an enlarged upper end, a cylindrical core, non-rotatable means extending through the table for supporting the core and also securing the same against rotation, and a collar provided with means whereby the collar may be detachably supported by the core, said collar serving as an internal form for the bell-mouth of a pipe.

6. In a machine of the class described, the combination with a rotary table, and a mold formed of laterally separable members, of chairs provided upon the table for supporting said mold at a distance thereabove, a palette adapted to be supported by the mold when the latter is supported by said chairs, and means provided on the palette whereby the same is supported when the mold is disengaged from the palette.

7. In a machine of the class described, in combination, a core, an upright rod adapted to be detachably connected to said core, a cable connected to said rod and guided so as to support the rod by two leads, a power-driven drum for actuating said cable to elevate or lower the core, and means for guiding the cable leads to the drum.

8. In a machine of the class described, the combination with a rotary table, of a mold comprising laterally separable members, and a palette forming part of the bottom of said mold and axially movable upwardly therein from its normal position and accessible from its under side, said palette having supporting portions extending below the lower end of the mold, the arrangement being such that when the filled mold is removed from the table and supported by a member engaging the palette the mold may be moved downwardly over the palette and supported article as a preliminary to lateral separation of the mold members.

9. In a machine of the class described, the combination with a rotary table, of a mold comprising laterally separable members, and a palette forming part of the bottom of said mold and axially movable upwardly therein from its normal position and accessible from its under side, the arrangement being such that when the filled mold is removed from the table and supported by a member engaging the palette the mold may be moved downwardly over the palette and supported article as a preliminary to lateral separation of the mold members.

10. A mold for concrete pipe comprising a pair of laterally separable external mold members, and a palette forming the bottom of said mold and axially movable in said members, said palette being freely accessible for external support beneath the same, whereby the pair of mold members may be slipped axially downward on the freshly formed pipe supported by the palette before being laterally withdrawn from said pipe, and supporting means carried by the mold for engaging and supporting the palette.

11. In a machine of the class described, the combination with a rotary mold-supporting table, means for rotating said table, a mold supported in said table, a core co-acting with said mold, a stationary pin projected upwardly through said table, and having an axially separable connection with said core holding the same against turning, means for raising the core from the table, and means engaging the upper end of the core and remaining active during raising of the core for holding the core against turning.

In witness whereof, I have hereunto set my hand at Tacoma, Washington, this 26th day of August, A. D. one thousand nine hundred and nineteen.

JAMES THOMAS.